United States Patent
DeLuca et al.

(10) Patent No.: US 9,088,534 B2
(45) Date of Patent: Jul. 21, 2015

(54) SYSTEMS AND METHODS FOR PROVIDING A RECIPIENT OF AN ELECTRONIC COMMUNICATION WITH DATA USED TO DETERMINE WHETHER TO RESPOND TO THE ELECTRONIC COMMUNICATION

(75) Inventors: Lisa Seacat DeLuca, San Francisco, CA (US); Yen-Kwang Lin, Durham, NC (US); Dana Lea Price, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 564 days.

(21) Appl. No.: 12/962,023

(22) Filed: Dec. 7, 2010

(65) Prior Publication Data

US 2012/0143964 A1   Jun. 7, 2012

(51) Int. Cl.
   *H04L 12/58*   (2006.01)

(52) U.S. Cl.
   CPC ............... *H04L 51/32* (2013.01); *H04L 51/34* (2013.01)

(58) Field of Classification Search
   USPC ....................................................... 709/206
   See application file for complete search history.

(56) References Cited

U.S. PATENT DOCUMENTS

| | | | |
|---|---|---|---|
| 7,698,380 B1 | 4/2010 | Amidon et al. | |
| 7,761,521 B2 | 7/2010 | Kubala et al. | |
| 7,809,805 B2 | 10/2010 | Stremel et al. | |
| 2003/0233421 A1 | 12/2003 | Shibata et al. | |
| 2004/0093255 A1 | 5/2004 | Kelman et al. | |
| 2004/0122803 A1* | 6/2004 | Dom et al. | 707/3 |
| 2005/0027803 A1* | 2/2005 | Kelley et al. | 709/206 |
| 2007/0005716 A1 | 1/2007 | LeVasseur et al. | |
| 2007/0106738 A1* | 5/2007 | Barnes et al. | 709/206 |
| 2007/0294358 A1 | 12/2007 | Kelley et al. | |
| 2008/0208988 A1 | 8/2008 | Khouri et al. | |
| 2008/0288601 A1 | 11/2008 | Keohane et al. | |
| 2009/0043851 A1 | 2/2009 | Weir et al. | |
| 2010/0017484 A1 | 1/2010 | Accapadi et al. | |
| 2010/0077050 A1 | 3/2010 | MacBeth et al. | |
| 2012/0110085 A1* | 5/2012 | Malik et al. | 709/205 |
| 2012/0210247 A1* | 8/2012 | Khouri et al. | 715/751 |

* cited by examiner

*Primary Examiner* — Angela Nguyen
(74) *Attorney, Agent, or Firm* — Schmeiser, Olsen + Watts LLP

(57) ABSTRACT

A system and method is described for delivering an electronic communication to a recipient. The system and method determines whether at least one other recipient received the electronic communication. A relationship is identified between the recipient and the at least one other recipient. A response assessment result is generated in response to the determined relationship. The response assessment result is presented to the recipient.

20 Claims, 3 Drawing Sheets

US 9,088,534 B2

SYSTEMS AND METHODS FOR PROVIDING A RECIPIENT OF AN ELECTRONIC COMMUNICATION WITH DATA USED TO DETERMINE WHETHER TO RESPOND TO THE ELECTRONIC COMMUNICATION

FIELD OF THE INVENTION

The present invention relates generally to systems and methods for processing electronic documents, and in particular, to systems and methods that provide a recipient of an electronic communication with information about other recipients of the same electronic communication.

BACKGROUND

Electronic mail (email) is a popular way for people to communicate with one another. When a computer user composes an email message, the email message can be sent to one or more recipients. Each recipient has the option of either replying to the sender's email message, or declining to respond.

Conventional email applications provide a recipient with limited information about other recipients of the same email message. For example, an email message to an employee inviting the employee of attend a meeting includes a list of other participants in the body of the email message. A person receiving an email invitation to an event can reply to all recipients, or to the sender only.

BRIEF SUMMARY

An embodiment features a computer-implemented method of delivering an electronic communication to a recipient. A determination is made whether at least one other recipient received the electronic communication. A relationship is identified between the recipient and the at least one other recipient. A response assessment result is generated in response to the determined relationship. The response assessment result is presented to the recipient.

Another embodiment features an electronic communication management system. The system includes a relationship manager that determines the relationship between a presently non-responsive recipient of an email message and a responsive recipient of the email message. The system further includes a presentation processor that generates a response assessment result in response to the determined relationship. The system further includes a presentation client that displays the response assessment result in a format that permits the presently non-responsive recipient to determine whether to respond to the email message.

Another embodiment features a computer program product for delivering an electronic communication to a recipient. The computer program product comprises a computer readable storage medium having computer readable program code embodied therewith. The computer readable program code comprises computer readable program code configured to determine whether at least one other recipient received the electronic communication. The computer readable program code further comprises computer readable program code configured to determine a relationship between the recipient and the at least one other recipient. The computer readable program code further comprises computer readable program code configured to generate a response assessment result in response to on the determined relationship. The computer readable program code further comprises computer readable program code configured to present the response assessment result to the recipient.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

In brief overview, the electronic communication systems and methods described herein address the social networking aspects of recipient response tracking, and provide visual indicators to email recipients based on these aspects. The social networking aspects include relationships between a recipient of an electronic communication who has not yet decided whether to respond to the communication and those recipients who have already responded.

The strength of these relationships can be determined according to degrees of separation between the recipients. The phrase "six degrees of separation" derives from a well-known social networking concept that each person is six or less relationships from any other person. For example, where an employee and her supervisor are recipients of the same email message, there is a direct relationship between the employee and her supervisor, and the employee can be categorized as having a first degree of separation with respect to her supervisor. In another example, where an employee and a "friend of a friend" of the employee are both recipients of the same email message, there is an indirect relationship between the two recipients, and the employee can be categorized as having a second degree of separation, or greater, with respect to his friend's friend.

During operation, information pertaining to the strength of the relationships between recipients can be collected from various sources, including social network utilities and/or information directories such as Lightweight Directory Access Protocol (LDAP) directories. A response assessment result is generated from this data. The response assessment result is presented to the recipient in a visual or audio format, which provides a recipient with an indication as to whether the recipient should respond. For example, the response assessment result can be displayed as a percentage value. A high percentage value indicates that the recipient should be more likely to respond, and a low percentage value indicates that the recipient should be less likely to respond. Thus, in categorizing relationships and displaying a response assessment result in response to data related to the categorized relationships, an email recipient can decide whether to respond in a timely manner to an email message, or whether to disregard the email message, depending on the relationships between the undecided recipient and the responsive recipients.

Figure 1:
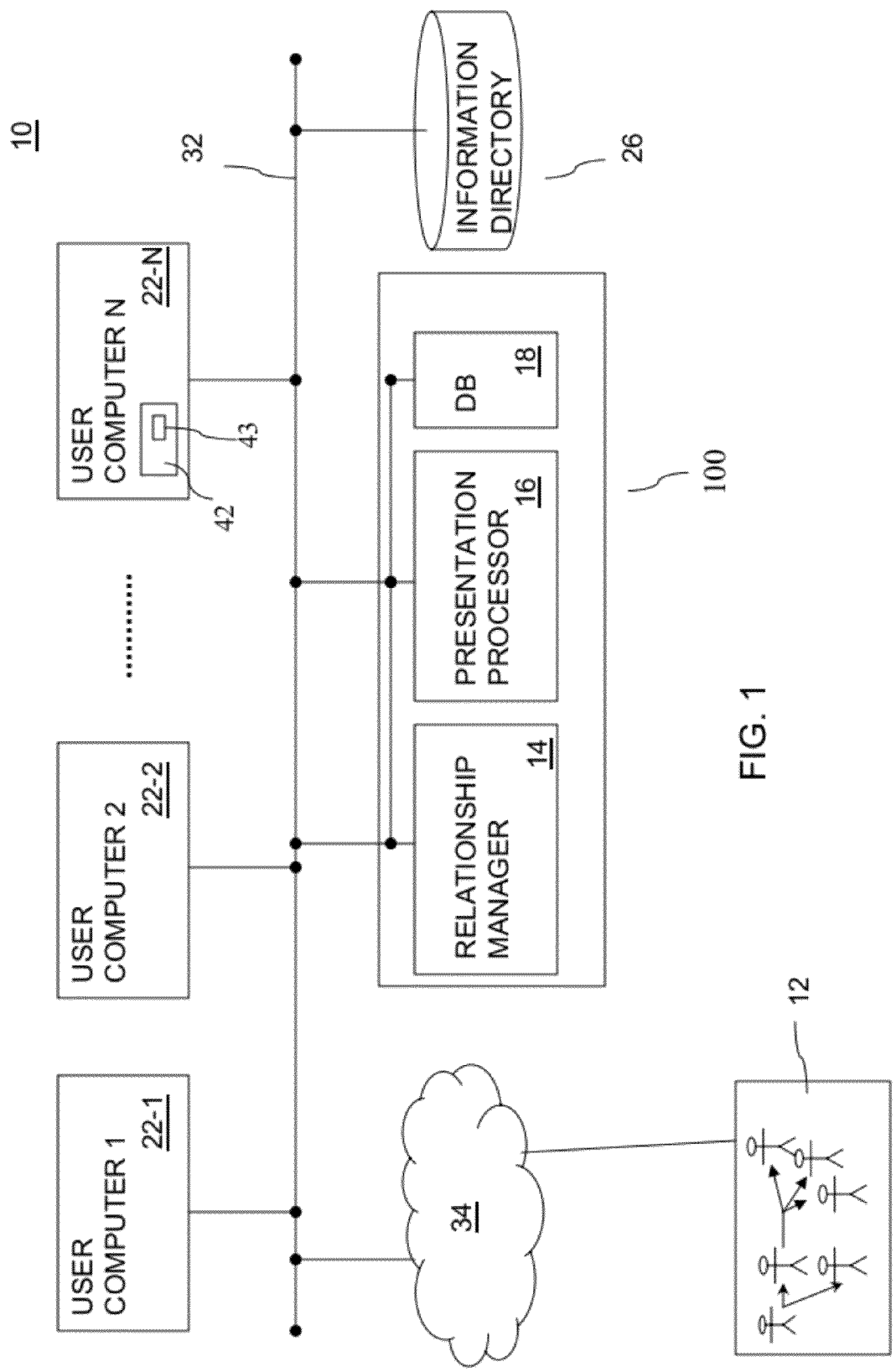
FIG. 1 is a block diagram illustrating an email management system in electronic communication with a plurality of user computers.

FIG. 1 is a block diagram illustrating a network environment 10 including one embodiment of an email management system 100 in electronic communication with a plurality of user computers 22-1, 22-2, 22-N (generally, 22). The email management system 100 in conjunction with the methods illustrated herein permit recipients at user computers 22 to make informed decisions about whether to respond to a received email message. The email management system 100 includes a relationship manager 14, a presentation processor 16, and a data repository 18.

The relationship manager 14 and presentation processor 16 can be collocated under a single hardware platform, including, but not limited to, a desktop computer, laptop computer, server system, or hand-held device such as a personal digital assistant (PDA). The relationship manager 14 and/or presentation processor 16 can be on the same hardware platform as an email user, such as computers 22. Alternatively, the relationship manager 14 and presentation processor 16 can be located on different hardware platforms, and can be in direct or indirect electronic communication with each other, for example, through a communication network such as a local area network (LAN) 32 or a wide area network (WAN) 34. The email management system 100 can also be in communication with information sources such as a social network service 12, such as Facebook™ or Linkedin™, or an information directory 26 such as a Lightweight Directory Access Protocol (LDAP) directory through the LAN 32 or the WAN 34.

A presentation client 42 can generate and output response assessment results, statistical data, and/or other results from the relationship data categorized by the relationship manager 14. The presentation client 42 receives the response assessment result from the presentation processor 16 and outputs the response assessment result in a format that is preferable to the second recipient. The presentation client 42 can be located on a recipient computer displaying the result, for example, as part of a standalone email client on the recipient computer 22-N, or as part of a web-based email application provided by a service provider. Alternatively, the presentation client 42 can be a standalone application on the recipient computer. Alternatively, the presentation client 42 can be located on an intervening device, such as a server, which communicates with the recipient computer 22-N.

One or more of the user computers 22 can include components known to those of ordinary skill in the art for inputting data to the email management system 100, and for receiving data from the email management system 100. These components can include, but not be limited to, a monitor or display, one or more user-input devices, e.g., a keyboard, a mouse, trackball, non-removable non-volatile storage media, for example, hard disks and CD ROMs, and/or other peripheral devices.

One or more of the user computers 22 can include software applications that execute entirely on the user computer, execute partly on the user computer, as a stand-alone software package, execute partly on the user computer and partly on a remote computer in communication with the user computer, for example, an email server, or execute entirely on a remote computer server. Software applications can include word processing applications, email client applications, web browsers, and/or other applications that produce and/or transmit electronic communications such as digital messages to and from the user computers 22.

During operation, a sender sends an email message from user computer 22-1, referred to as a sender computer, to user computer 22-2 through computer 22-N, referred to as recipient computers. The email message can be transmitted from a standalone email application, or from an internet service provider offering email services such as webmail, where the user accesses email services from a web browser on the sender computer 22-1. Although email messages are referred to in this embodiment, other types of electronic communication can apply, such as word processing documents, collaborative messages such as instant messages or text messages, file sharing applications, blogs, or other electronic documents comprising text, graphics, video, and/or audio.

One or more recipients can send an email message to the sender in response to the sender's email message. For example, a first recipient at the user computer 22-2 can send an email message to the sender computer 22-1, acknowledging receipt of the sender's email message.

When the first recipient responds to the sender's email message, the relationship manager 14 determines the strength of the relationship between a second recipient at the recipient computer 22-N who has not yet responded to the sender's message, also referred to as an unresponsive recipient or undecided recipient, and the first recipient. The strength of the relationship can be determined according to social networking concepts, such as the abovementioned six degrees of separation concept. The strength of the relationship can alternatively be determined from a relationship mapping scheme, such as a hierarchical map, organizational chart, or genealogy chart. The relationship manager 14 can receive such relationship data on recipient relationships from a variety of information sources. Information related to the identity of the recipients can be retrieved from metadata, for example, associated with the first recipient's email message. Other information sources can include a social network service 12, such as Facebook™ or Linkedin™, or an information directory 26 such as a Lightweight Directory Access Protocol (LDAP) directory. The relationship data can be categorized according to the strength of the relationship between each non-responsive recipient such as the second recipient and each responsive recipient such as the first recipient. The relationship data can be stored in the data repository 18 for subsequent retrieval by the presentation processor 16.

The presentation processor 16 generates a response assessment result based on the strength of the relationship between the second recipient and the other responsive recipients such as the first recipient. The response assessment result can be displayed to each non-responsive recipient, such as the second recipient 22-N, in real-time, for example, when an email application is executed and displayed on the recipient's computer. The response assessment result is displayed in a format that permits the non-responsive recipient to make an informed decision as to whether to respond. Examples of such formats are described below. Each non-responsive recipient of the same email message can receive different response assessment results, since the relationships between the non-responsive recipients and the responsive recipients can be different.

In an embodiment, the presentation processor 16 assigns a weight value to the relationship data provided by the relationship manager 14. Close relationships are assigned higher weight values than distant relationships. For example, where the relationship between the first and second recipients is determined to be a direct or first degree relationship, e.g., between a manager and a subordinate, the relationship manager 14 can assign a first weight value to the relationship. Where another relationship is determined between the second recipient and another recipient of the same email message to have two or more degrees of separation, the relationship manager 14 can assign a second weight value to this relationship that is lower than the weight value assigned to the abovementioned manager/subordinate relationship. The relationship data pertaining to each relationship can be adjusted in accordance with the corresponding weight values, and the presentation processor can generate a response assessment result based on the modified relationship data.

In one embodiment, the presentation client 42 displays the response assessment result in numerical form. In another embodiment, the presentation client 42 displays the response assessment result in graphical form, for example, a pie chart.

The presentation client 42 can include a display meter that displays a list of the recipients, and can include indicators that identify recipients among the list of recipients who previously responded to the sender's email message. The meter can be dynamically updated as additional recipients respond to the sender's email message.

For example, when an email message is sent by the sender to 20 recipients, and 3 recipients have responded, the display meter can output the name or email address of each of the 3 recipients. The display meter can be configured to display a percentage value, indicating that 15% of the respondents responded to the email message. The display meter can also be configured to display a pie chart, indicating that 15% of the respondents responded to the email message.

In a preferred embodiment, the display meter can display the response assessment result generated by the presentation processor 16. The response assessment result can be displayed as a list of responsive recipients who have a particular relationship with the second recipient, for example, those responsive recipients who may be of interest to the user. For example, when an email message is sent by the sender to the second recipient, and is also sent to the second recipient's manager and two colleagues who subsequently respond to the email message, the display meter can be configured to output a notification to the second recipient that the second recipient's manager and two colleagues responded to the email message. The display meter can also be configured to not display another responsive recipient if the relationship manager 14 determines that there is a high degree of separation, for example, third degree of separation or greater, between the other recipient and the second recipient. Alternatively, the display meter can be configured to display all of the responding recipients, but to distinguish the second recipient's manager and two colleagues from the other responsive recipient by highlighting the manager and colleagues in a different color or font.

Alternatively, the display meter can be configured to display a "YES" if the second recipient should respond, or display a "NO" recommendation if the second recipient need not respond.

Figure 2A:
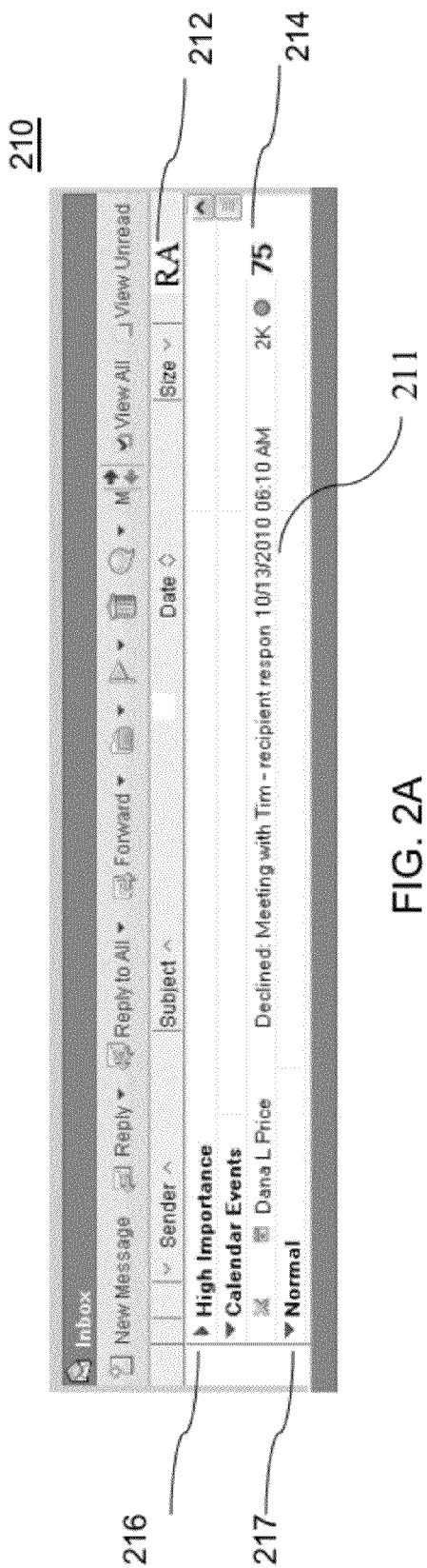
FIG. 2A is a screenshot of an email application inbox displaying a response assessment result.

FIG. 2A is a screenshot of an email application inbox 210 displaying a response assessment result 214 corresponding to an email message 211 sent to an unresponsive recipient. More specifically, FIG. 2A provides an example of one format in which the response assessment result can be presented to the unresponsive recipient. In the previous example, where three of the four responsive recipients have a close relationship with the unresponsive recipient, and where the remaining fourth responsive recipient has a distant relationship with the unresponsive recipient, the unresponsive recipient can receive an indicator, recommending that the unresponsive recipient respond to the sender's email message.

The header of the inbox 210 includes a response assessment (RA) indicator 212, under which a response assessment result 214 is displayed. Here, the response assessment result 214 is displayed as an assessment recommendation value, which can be determined by the presentation processor 16. The assessment recommendation value is determined by the presentation processor 16 based on the strength of the relationship between the recipient and each of the other recipients of the same email message who previously responded, for example, three of the four responsive recipients, i.e., the manager and two colleagues of the second recipient referred to in the example above. A high value, for example, a value greater than 60, provides a strong recommendation that a recipient respond to the email message. Therefore, the assessment recommendation value of 75 shown in this example suggests that the unresponsive recipient should respond.

The response assessment result 214 can be updated when additional recipients respond to the sender's email message. For example, when an additional recipient responds who has a distant relationship, for example, a third degree of separation, with the unresponsive recipient, the value can decrease. For example, the assessment recommendation value of 75 shown in FIG. 2A can be updated with a lower value based on strength of the third degree relationship between the additional recipient and the unresponsive recipient. On the other hand, when an additional recipient responds having a close relationship, for example, a first degree of separation, with the unresponsive recipient, the percentage value can increase. Weight values can be assigned to each responding recipient, which can result in response assessment results.

The email message 211 can be transferred between email categories in the inbox 210, for example, from the High Importance category 216 of the inbox to the Normal category 217. Each category can be configured to receive email messages that fall within a predetermined range of response assessment results. For example, the High Importance category 216 can be configured to include email messages having an assessment recommendation value range of 75 to 100, while the Normal Importance category 217 can be configured to include email messages having an assessment recommendation value range of 25 to 74. A Low Importance category (not shown) can be configured to include email messages having an assessment recommendation value range of 0 to 24. The email message 211 is shown in FIG. 2A as being in a High Importance category. If the assessment recommendation value is decreased, for example, by additional responding recipients having a distant relationship with the unresponsive recipient, the status of the email message 211 can change from High Importance to Normal Importance.

The inbox 210 can contain several email messages, each having a corresponding response assessment result 214. The presentation client 16 permits an email user to sort her email inbox based on responses and prioritize those most likely requiring a response. Here, an unresponsive recipient can sort email messages in the inbox 210 according to the assessment recommendation values, for example, in descending order or ascending order.

In an embodiment, when the response assessment result 214 exceeds a predetermined threshold value, for example, the assessment recommendation value of 75 shown in FIG. 2A can be a threshold value, a flag can be set next to the email message, informing the unresponsive recipient that a response is required. In another embodiment, a calendar "to do" entry can be created, reminding the unresponsive recipient that a response is required. The assessment recommendation value can also be decreased in response to the time passed since the unresponsive recipient received the sender's email message. The assessment recommendation value can be gradually reduced to 0 when a predetermined amount of time has passed that is considered excessive to the unresponsive recipient.

Email messages that are related to the same subject can be linked to each other. For example, three managers from the same organization may send separate email messages to their respective departments, inviting the recipients to the same meeting. The email messages are related to each other in that they pertain to the same topic, i.e., an invitation to the same meeting. The computer display of a recipient in one of the three departments who has not yet responded can indicate a listing of all recipients of the three email messages. The listing can be updated as the unresponsive recipient receives email responses from other recipients in the three departments. The listing can also be updated as other recipients respond to the email invitation, regardless of whether the unresponsive recipient is copied on a responsive recipient's email distribution. In addition, the unresponsive recipient can receive a response assessment result corresponding to responding recipients from all three departments, which is generated according to the systems and methods described herein.

Returning to FIG. 1, the presentation client 42 can include a response monitor 43, which can be activated by the unresponsive recipient to display the recipients of the sender's email message in the header or body of the email message received by the unresponsive recipient. The recipients can be displayed and categorized according to responsive recipients and unresponsive recipients.

Figure 2B:
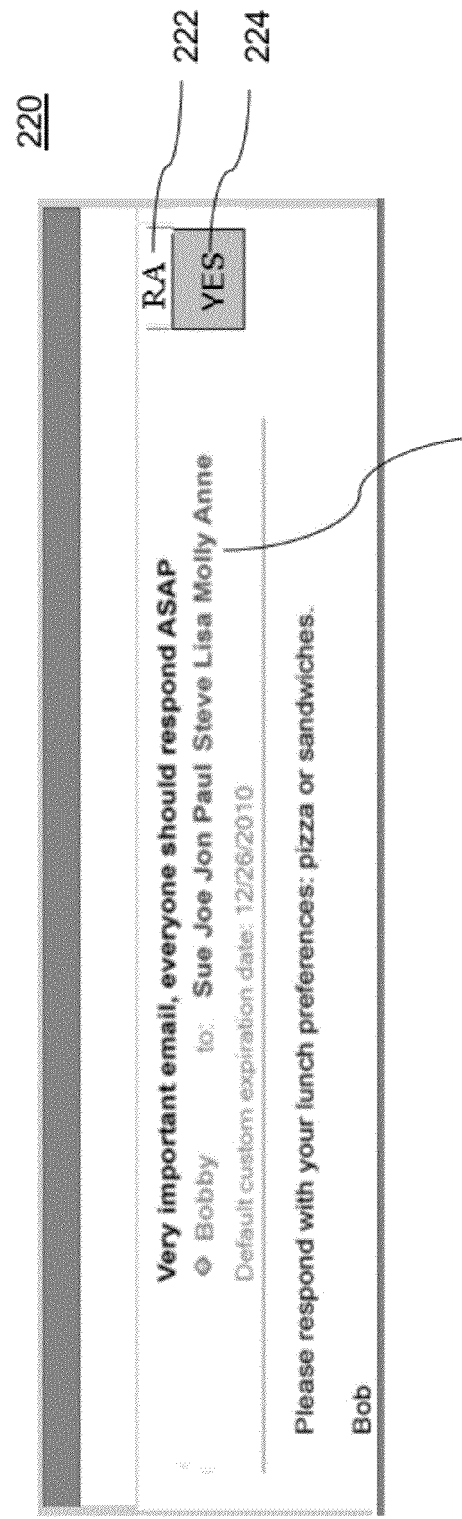
FIG. 2B is a screenshot of an email message that includes a response recommendation.

For example, referring to FIG. 2B, the response monitor can display a list of recipients 226, and identify those recipients who have responded by a particular color, for example, green, and identify unresponsive recipients by a different color, for example, red. The response monitor can also identify those responsive recipients who have provided multiple responses by a different color, for example, blue. Responsive recipients and unresponsive recipients can alternatively be distinguished from each other by font type or size, or by other visual distinctions.

The email message 220 shown in FIG. 2B further includes an RA indicator 212 that displays a response recommendation as to whether an unresponsive recipient should respond to the sender's email message. For example, instead of providing a response assessment value, the indicator displays a "YES" if the unresponsive recipient should respond to the sender's email message, and displays a "NO" if the unresponsive recipient need not respond to the sender's email message, similar to the display meter described above. This indicator preserves the anonymity of those recipients who previously responded. Other indicators can be provided, such as a color-coded indicator configured to be similar to a traffic light, where red indicates that no response is required, yellow indicates that a response is recommended, and green indicates that a response is strongly recommended. As described above, the emails in the unresponsive recipient's inbox can be categorized according to the status of the indicator as to whether the emails require a response.

As additional recipients respond to the sender's email message, the unresponsive recipient can receive a message that informs the sender that a new response has been sent to the sender. The response assessment value can be adjusted accordingly, and the percentage value or other indicator can likewise change.

Figure 3:
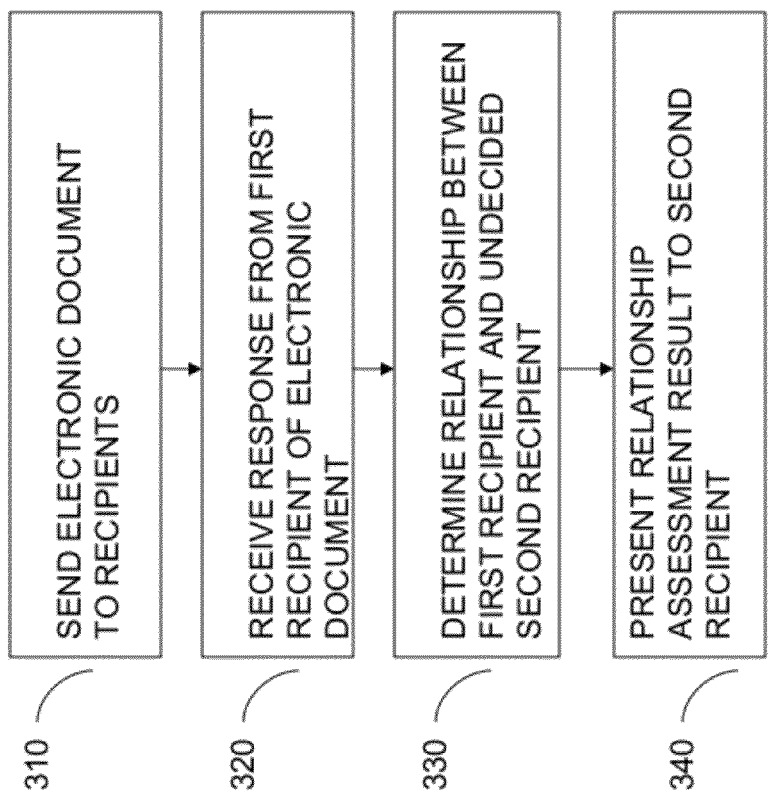
FIG. 3 is a flow diagram of an embodiment of a method for processing information related to the receipt of digital messages.

FIG. 3 is a flow diagram of an embodiment of a method 300 for processing information related to the receipt of digital messages, in accordance with the principles of the invention. In one embodiment, the method 300 is performed by the email management system 100 shown in FIG. 1. In other embodiments, the method 300 is performed on a user computer, for example, one or more user computers 22 shown in FIG. 1.

The method 300 commences with the sender sending (step 310) an electronic communication to one or more recipients. The electronic communication can be an e-mail message created by the sender and sent to the recipients via an email application on the sender computer. Alternatively, the electronic communication can be a word processing document, collaborative message, such as instant messaging or text messaging, file sharing application, blog, or other electronic document comprising content such as text, graphics, audio exchanged between users.

At least one recipient, referred to as a first recipient, sends a response to the sender (step 320). The response can be a digital message similar to the digital messages described above, for example, an email message.

A relationship is determined (step 330) between the responsive first recipient and a unresponsive recipient, also referred to as an undecided second recipient, who has not yet decided whether to respond, and categorized according to social networking concepts, such as the abovementioned six degrees of separation concept, or according to relationship data collected from an information source, such as an LDAP directory.

A response assessment notification is output (step 340) to the undecided second recipient. The response assessment notification can be displayed on the undecided second recipient's email application or other application used to communicate with other computer users. The response assessment notification can be displayed in a format that is useful to the undecided second recipient in making an informed decision as to whether to send an electronic response to the sender.

The systems and methods described herein can be applied to operations where the recipients of an electronic communication are part of the same organizational hierarchy or social network, or where only some of the recipients of the email message are part of the same organizational hierarchy or social network. Undecided recipients have the option of indicating whether they are only interested in the response rate of recipients within their organizational hierarchy or social network.

While embodiments of the email management system and method have been described with respect to email applications, they are not limited to such applications. Other applications are contemplated in which responses to electronic communications are required, such as performance-based contracting (PBC) tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method of delivering an electronic communication to a recipient, comprising:
    sending an electronic communication from a sender to a plurality of recipients;
    determining that at least one other recipient generated a response to the electronic communication;
    identifying a relationship between a recipient who has not yet responded to the electronic communication and the at least one other recipient that generated the response;
    determining a strength of the relationship between the recipient who has not yet responded to the electronic communication and the at least one other recipient that generated the response, the strength of the relationship ranging from a close relationship to a distant relationship;
    generating a response assessment result for the recipient who has not yet responded to the electronic communication in response to the determined relationship between the recipient who has not yet responded to the electronic communication and the at least one other recipient that generated the response, wherein the response assessment result is different when the strength of the relationship is the close relationship than when the relationship is the distant relationship; and
    outputting the response assessment result to the recipient who has not yet responded to the electronic communication, the response assessment result including information related to a recommendation whether to respond to the electronic communication and alerting the recipient who has not yet responded to the electronic communication of the at least one other recipient that generated the response.

2. The computer-implemented method of claim 1, wherein determining the strength of the relationship includes determining a degree of separation between the recipient and the at least one other recipient.

3. The computer-implemented method of claim 1, wherein the relationship between the recipient and the at least one other recipient is determined from an information directory.

4. The computer-implemented method of claim 1, wherein the relationship between the recipient and the at least one other recipient is determined from a social network service.

5. The computer-implemented method of claim 1, wherein presenting the response assessment result includes displaying the response assessment result on a recipient electronic device as a value indicative of a recommendation that the non-responsive recipient who has not yet responded to the electronic communication responds to the email message.

6. The computer-implemented method of claim 1, wherein presenting the response assessment result includes displaying the response assessment result on a recipient electronic device as a recommendation indicator.

7. The computer-implemented method of claim 1, wherein presenting the response assessment result includes displaying the response assessment result on a recipient electronic device in a graphical format.

8. The computer-implemented method of claim 1, wherein the electronic communication is an email message.

9. The computer-implemented method of claim 1, wherein the at least one other recipient includes all recipients who have responded to the electronic communication and wherein generating the relationship assessment is in response to the determined relationship between the recipient and the all recipients.

10. The computer-implemented method of claim 3, wherein the information directory includes a Lightweight Directory Access Protocol (LDAP) directory.

11. An electronic communication management system comprising:
a relationship manager that determines a strength of a relationship between a presently non-responsive recipient of an email message and a responsive recipient of the email message, the strength of the relationship ranging from a close relationship to a distant relationship;
a presentation processor that generates a response assessment result for the recipient who has not yet responded to the electronic communication in response to the determined strength of the relationship between the non-responsive recipient and the responsive recipient, wherein the response assessment result is different when the strength of the relationship is the close relationship than when the relationship is the distant relationship; and
a presentation client that displays the response assessment result in a format that permits the presently non-responsive recipient to determine whether to respond to the email message based on the determined relationship, the response assessment result including information related to a recommendation whether to respond to the email message and alerting the recipient who has not yet responded to the electronic communication of the at least one other recipient that generated the response.

12. The electronic communication management system of claim 11, wherein the relationship manager determines a degree of separation between the responsive recipient and the presently non-responsive recipient.

13. The electronic communication management system of claim 11, wherein the relationship manager determines the relationship between the responsive recipient and the presently non-responsive recipient from data retrieved from an information directory.

14. The electronic communication management system of claim 11, wherein the relationship manager determines the relationship between the responsive recipient and the presently non-responsive recipient from a social network service.

15. The electronic communication management system of claim 11, wherein the presentation client displays the response assessment result on a recipient electronic device as a value indicative of a recommendation that the presently non-responsive recipient responds to the email message.

16. The electronic communication management system of claim 11, wherein the response assessment result is displayed on a recipient electronic device as a recommendation indicator.

17. The electronic communication management system of claim 11, wherein the response assessment result is displayed on a recipient electronic device in a graphical format.

18. The electronic communication management system of claim 11, wherein the electronic communication is an email message.

19. The electronic communication management system of claim 13, wherein the information directory includes a Lightweight Directory Access Protocol (LDAP) directory.

20. A computer program product for delivering an electronic communication to a recipient, the computer program product comprising:
a computer readable storage medium having computer readable program code embodied therewith, the computer readable program code comprising:
computer readable program code configured to send an electronic communication from a sender to a plurality of recipients;
computer readable program code configured to determine that at least one other recipient generated a response to the electronic communication;
computer readable program code configured to determine a strength of a relationship between a recipient who has not yet responded to the electronic communication and the at least one other recipient that generated the response, the strength of the relationship ranging from a close relationship to a distant relationship;
computer readable program code configured to generate a response assessment result for the recipient who has not yet responded to the electronic communication in response to the determined strength of relationship between the recipient who has not yet responded to the electronic communication and the at least one other recipient that generated the response, wherein the response assessment result is different when the strength of the relationship is the close relationship than when the relationship is the distant relationship; and
computer readable program code configured to output the response assessment result to the recipient who has not yet responded to the electronic communication,
wherein the medium is not a signal, the response assessment result including information related to a recommendation whether to respond to the electronic communication and alerting the recipient who has not yet responded to the electronic communication of the at least one other recipient that generated the response.

* * * * *